US011799859B2

(12) United States Patent
Masjuan (10) Patent No.: US 11,799,859 B2
(45) Date of Patent: Oct. 24, 2023

(54) AUTOMATED AUTHORIZATION POLICY CREATION FOR INTERRELATED SERVICES (71) Applicant: Red Hat, Inc., Raleigh, NC (US)

(72) Inventor: Xavier C. Masjuan, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 135 days.

(21) Appl. No.: 17/023,658

(22) Filed: Sep. 17, 2020

(65) Prior Publication Data

US 2022/0086157 A1 Mar. 17, 2022

(51) Int. Cl.
*H04L 29/06* (2006.01)
*H04L 9/40* (2022.01)

(52) U.S. Cl.
CPC .............. *H04L 63/10* (2013.01); *H04L 63/20* (2013.01)

(58) Field of Classification Search
CPC ....... H04L 63/10; H04L 63/20; H04L 63/108; H04L 63/205; G06F 21/60; G06F 21/50
USPC .......................................................... 726/1
See application file for complete search history.

(56) References Cited

U.S. PATENT DOCUMENTS

| 9,411,955 | B2 * | 8/2016 | Jakobsson ............... H04L 63/14 |
| 10,075,442 | B2 | 9/2018 | Simpson et al. |
| 10,623,390 | B1 | 4/2020 | Rosenhouse |
| 2007/0280107 | A1 * | 12/2007 | Ludwig ................. H04L 1/0002 370/230 |
| 2013/0031161 | A1 * | 1/2013 | Yang ........................ G06F 9/485 709/203 |
| 2017/0329957 | A1 | 11/2017 | Vepa et al. |
| 2020/0267155 | A1 * | 8/2020 | Segal .................... G06F 21/554 |
| 2021/0019194 | A1 * | 1/2021 | Bahl ....................... G06N 20/00 |

FOREIGN PATENT DOCUMENTS

| CN | 110554856 A | 12/2019 |
| WO | 2019169405 A1 | 9/2019 |

OTHER PUBLICATIONS

Chugtu, Manish, "Demystifying Istio's Sidecar Injection Model," https://istio.io/latest/blog/2019/data-plane-setup/, Jan. 31, 2019, 10 pages.
Hussain, Fatima, et al., "Intelligent Service Mesh Framework for API Security and Management," 2019 IEEE 10th Annual Information Technology, Electronics and Mobile Communication Conference (IEMCON), 2019, 8 pages.

(Continued)

*Primary Examiner* — Longbit Chai
(74) *Attorney, Agent, or Firm* — Dority & Manning, P.A.

(57) ABSTRACT

Automated authorization policy creation for interrelated services is disclosed. A plurality of request records is obtained, each request record corresponding to a request sent from a sending service of a plurality of services to a receiving service of the plurality of services, and each request record identifying the sending service and the receiving service, wherein the plurality of services comprises a plurality of interrelated services. A first subset of the request records is determined wherein a service of the plurality of services sent a request to a first service. A first subset of services is determined based on the first subset of request records. The generation of an authorization policy is caused that permits requests to the first service from only those services in the first subset of services.

20 Claims, 5 Drawing Sheets (56) References Cited

OTHER PUBLICATIONS

Vincken, Pieter, "ISTIO Service Mesh: Service to Service Communication," https://ordina-jworks github.io/cloud/2019/05/03/istio-service-mesh-s2s.html, May 3, 2019, 11 pages.

* cited by examiner

AUTOMATED AUTHORIZATION POLICY CREATION FOR INTERRELATED SERVICES

BACKGROUND

Interrelated services, such as services in a service mesh, are often controlled in part by an authorization management system that utilizes authorization polices to ensure that use of a service is authorized. Such authorization policies may limit which service can send a request to another service.

SUMMARY

The examples disclosed herein implement automated authorization policy creation for interrelated services. The examples, among other advantages, eliminate a need for an in-depth understanding of the communications between interrelated services prior to establishing secure authorization policies, and eliminate the time-consuming and error-prone manual entry of potentially hundreds of authorization policies.

In one example a method is provided. The method includes obtaining, by a computing device, a plurality of request records, each request record corresponding to a request sent from a sending service of a plurality of services to a receiving service of the plurality of services, and each request record identifying the sending service and the receiving service, wherein the plurality of services comprises a plurality of interrelated services. The method further includes determining a first subset of the request records wherein a service of the plurality of services sent a request to a first service. The method further includes determining a first subset of services based on the first subset of request records. The method further includes causing the generation of an authorization policy that permits requests to the first service from only those services in the first subset of services.

In another example a computing device is provided. The computing device includes a memory and a processor device coupled to the memory. The processor device is to obtain a plurality of request records, each request record corresponding to a request sent from a sending service of a plurality of services to a receiving service of the plurality of services, and each request record identifying the sending service and the receiving service, wherein the plurality of services comprises a plurality of interrelated services. The processor device is further to determine a first subset of the request records wherein a service of the plurality of services sent a request to a first service. The processor device is further to determine a first subset of services based on the first subset of request records. The processor device is further to cause the generation of an authorization policy that permits requests to the first service from only those services in the first subset of services.

In another example a non-transitory computer-readable storage medium is provided. The non-transitory computer-readable storage medium includes executable instructions to cause a processor device to obtain a plurality of request records, each request record corresponding to a request sent from a sending service of a plurality of services to a receiving service of the plurality of services, and each request record identifying the sending service and the receiving service, wherein the plurality of services comprises a plurality of interrelated services. The instructions further cause the processor device to determine a first subset of the request records wherein a service of the plurality of services sent a request to a first service. The instructions further cause the processor device to determine a first subset of services based on the first subset of request records. The instructions further cause the processor device to cause the generation of an authorization policy that permits requests to the first service from only those services in the first subset of services.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Interrelated services, such as services in a service mesh, are often controlled in part by an authorization management system that utilizes authorization polices to ensure that use of a service is authorized. Such authorization policies may limit which service can send a request to another service. If a first service is not authorized to send a request to a second service, the authorization management system rejects the request.

A complex application, such as, by way of non-limiting example, a retailer's website, may comprise tens or even hundreds of interrelated services. Establishing the appropriate authorization policies for tens or hundreds of interrelated services requires knowledge of which services send requests to which other services, and requires establishment of corresponding authorization polices. This requires not only in-depth knowledge of the application, but can be very time-consuming, and, when the authorization polices are manually created, fraught with the potential for an inadvertent error that results in the complex application not operating correctly.

New service mesh infrastructures, such as, by way of non-limiting example, Istio (www.istio.io), offer many benefits for the development and operation of complex applications, which include, for example, enhanced security, enhanced visibility into communications between different parts of the application, automated load balancing, and increased network traffic statistics. As conventional complex applications are re-engineered into a plurality of interrelated services to take advantage of such new service mesh architectures, the need to generate authorization policies for a relatively large number of interrelated services increases.

The examples disclosed herein implement automated authorization policy creation for interrelated services. The examples establish a trust period wherein interrelated services are permitted to send requests to other services. The requests are recorded in request records that identify that a request has been sent from a sending service to a receiving service. After the trust period ends, the request records generated during the trust period are analyzed to determine which services made requests of which other services. Authorization policies are automatically created based on the request records. An operator may analyze the authorization policies to revise, delete, or supplement them. After the authorization policies are generated, subsequent requests are rejected or accepted in accordance with the authorization policies. The examples, among other advantages, eliminate a need for an in-depth understanding of the communications between interrelated services prior to establishing secure authorization policies, and eliminate the time-consuming and error-prone manual entry of potentially hundreds of authorization policies.

Figure 1:
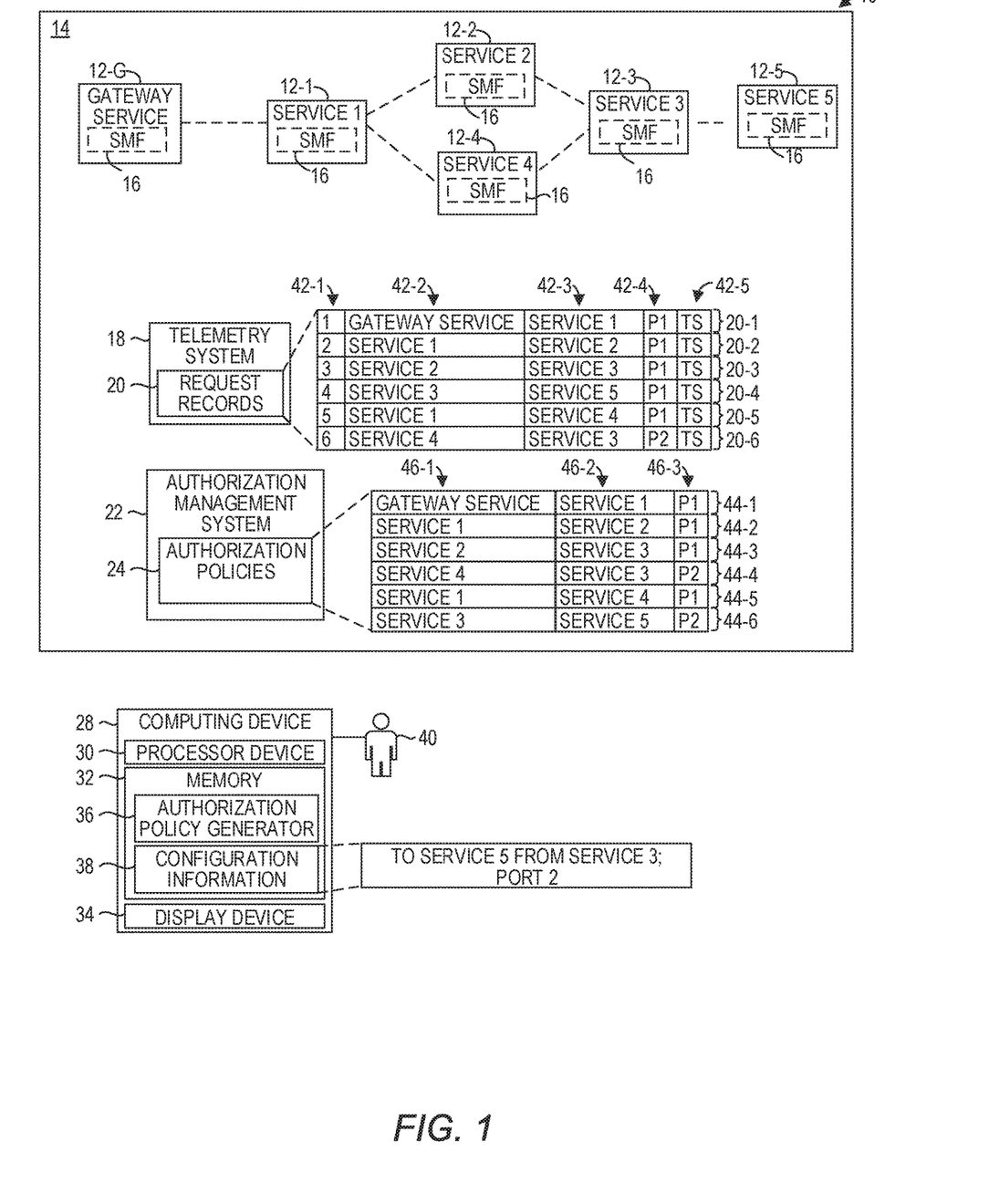
FIG. 1 is a block diagram of an environment in which examples of automated authorization policy creation for interrelated services may be practiced.

FIG. 1 is a block diagram of an environment 10 in which examples of automated authorization policy creation for interrelated services may be practiced. The environment 10 includes a plurality of interrelated services 12-1-12-5 (generally, services 12) that implement a desired application, such as, by way of non-limiting example, an online retail store. The interrelated services 12 are, in this example, implemented in a service mesh 14. In some implementations, such as that illustrated in FIG. 1, the service mesh 14 is implemented via a service mesh infrastructure that may be used to provide certain infrastructure services to any service mesh, irrespective of the function of the service mesh. One such service mesh infrastructure is Istio (www.istio.io), although the examples disclosed herein are not limited to any particular service mesh architecture. The service mesh infrastructure includes components, referred to herein as service mesh functions (SMFs) that implement standardized network communications among each of the services 12-1-12-5. Thus, each of services 12-1-12-5 includes an SMF 16 that handles network communications for the respective service 12-1-12-5. In Istio, the SMF 16 may be referred to as a "sidecar proxy container," which is implemented via an Envoy proxy (www.envoyproxy.io). Each service 12 may receive messages from one or more other services 12 via the corresponding sidecar proxy container (e.g., SMF 16), and each service 12 may send messages to one or more other services 12 via the corresponding sidecar proxy container (e.g., SMF 16).

In some implementations, the services 12-1-12-5 may be containers, and the service mesh infrastructure may automatically inject the SMF 16 into each of the services 12-1-12-5. In some implementations, each of the services 12-1-12-5 may be implemented as a Kubernetes pod (kubernetes.io), and the service mesh infrastructure may automatically inject the SMF 16 into the Kubernetes pod as a separate container.

The service mesh 14 may also include a telemetry system 18 that generates records that store traffic statistics and other information regarding communications between the services 12. In this example, the records include a plurality of request records 20-1-20-6, each of which corresponds to a request sent from a sending service 12 to a receiving service 12. The term "sending service 12" is used to refer to a service 12 that sends a request, sometimes referred to as a workload, to another service 12. The term "receiving service 12" refers to a service 12 that receives a request from a sending service 12. Some or all of the services 12 may be both sending services 12 for some requests, and receiving services 12 for other requests. While solely for purposes of illustration the telemetry system 18 is illustrated as a single component, in practice, the telemetry system 18 may be implemented as a distributed system, with telemetry components included in each SMF 16. Moreover, while only request records 20 are illustrated, the telemetry system 18 may gather any number of different statistics relating to the service mesh 14.

The service mesh 14 also includes an authorization management system 22 that implements a security mechanism for the service mesh 14. In particular, the authorization management system 22 may have a plurality of authorization policies 24 that govern communications between the services 12. Again, while solely for purposes of illustration the authorization management system 22 is illustrated as a single component, in practice, the authorization management system 22 may be implemented as a distributed system, with authorization management system 22 components included in each SMF 16.

Although not illustrated, the services 12-1-12-5 execute on computing devices that include a processor device and a memory. The services 12-1-12-5 may execute on separate computing devices, or some or all of the services 12-1-12-5 may execute on a same computing device. In some implementations, the service mesh 14 is implemented in a cloud computing environment.

It is noted that the communication of requests among the services 12 may be by any desired message-passing mechanism, including, by way of non-limiting example, the transmission of one or more packets from one service 12 to another service 12, the transfer of information from one service 12 to another service 12 via variables, or any other inter-process communication mechanisms that facilitate the communication of information from one process to another process.

The interrelated services 12 are typically not exposed to any services, including applications or processes, outside of the service mesh 14. Thus, applications and processes outside of the service mesh 14 may only be aware of a gateway service 12-G, which serves as a gateway into the service mesh 14, and otherwise have no ability to communicate directly with any other service 12.

The environment 10 also includes a computing device 28, which includes a hardware processor device 30, a memory 32, and a display device 34. The memory 32 includes an authorization policy generator 36 which is configured to generate authorization policies 24, as discussed in greater detail below. The memory 32 may also include configuration information 38, which may be used by the authorization policy generator 36 to generate the authorization policies 24. While solely for purposes of illustration the authorization policy generator 36 is illustrated as being separate from the authorization management system 22, in some implementations the authorization policy generator 36 may be a component of, or otherwise integrated into, the authorization management system 22.

An example of automated authorization policy creation for the interrelated services 12 will now be discussed. Initially, a trust stage begins. During the trust stage, the authorization management system 22 does not inhibit any communications between the services 12. The trust stage may have a duration for a period of time such as 1 minute, 5 minutes, 1 hour, 1 day, or the like. A timer may automatically be maintained by the authorization management system 22, the authorization policy generator 36, or may be manually maintained by an operator 40. The services 12 operate during the trust stage and communicate with one another. In particular, some services 12 send requests to other services 12. Each such request is recorded by the telemetry system 18 as a request record 20. In some implementations, in lieu of a timer, the operator 40 may control the duration of the trust stage.

After the trust stage ends, such as when the timer has expired or the operator 40 has terminated the trust stage, the authorization policy generator 36 accesses the request records 20 that were generated during the trust stage. The request records 20 may include a number of fields, such as a unique identifier (ID) field 42-1 that identifies a unique request record ID, a sending service field 42-2 that identifies a sending service 12 associated with a request, a receiving service field 42-3 that identifies a receiving service 12 associated with a request, a port number field 42-4 that identifies a port number of the receiving service 12 to which the sending service 12 sent the request, and a timestamp field 42-5 that identifies a timestamp of the time of the request.

In this example, the request records 20 comprise request records 20-1-20-6. The authorization policy generator 36 accesses the request records 20-1-20-6 and, based on the timestamp field 42-5, determines that the request records 20-1-20-6 were generated during the trust stage. For each of the services 12, the authorization policy generator 36 determines the subset of request records 20-1-20-6 in which the service 12 is a receiving service 12. The authorization policy generator 36 then determines the subset of services 12 of all the services 12 that are identified as sending services 12 in the subset of request records 20-1-20-6. The authorization policy generator 36 then generates an authorization policy 24 that permits requests to the service 12 from only those services 12 identified as sending services 12 in the subset of request records 20-1-20-6. The authorization policy 24 may be implemented via the generation of one or more authorization policy records 44.

As an example, the authorization policy generator 36 may analyze the request records 20 to determine if the service 12-1 is a receiving service for any requests. The authorization policy generator 36 identifies the request record 20-1 as the only request record 20 in which the service 12-1 is a receiving service. The authorization policy generator 36 then determines, based on the sending service field 42-2 of the request record 20-1, that the gateway service 12-G was the sending service. Based on the port number field 42-4 of the request record 20-1, the authorization policy generator 36 determines that the gateway service 12-G sent the request to the service 12-1 addressed to a port P1 of the service 12-1. The authorization policy generator 36 accesses the configuration information 38 and determines that there are no particular restrictions identified for the service 12-1. The authorization policy generator 36 generates an authorization policy 24 for the service 12-1 in the form of an authorization policy record 44-1. In this example, each authorization policy record 44-1-44-6 includes three fields. A sending service field 46-1 identifies a sending service; a receiving service field 46-2 identifies a receiving service; and a port number field 46-3 identifies a port number. The authorization policy record 44-1 thus authorizes requests to the service 12-1 only from the gateway service 12-G, and only to port P1 of the service 12-1. Any requests sent to the service 12-1 from any service 12 other than the gateway service 12-G will be rejected, and any request sent from the gateway service 12-G to the service 12-1 to any port other than port P1 will be rejected.

In a similar manner, the authorization policy generator 36 analyzes the request records 20 to determine if the service 12-2 is a receiving service for any requests. Based on the request record 20-2, the authorization policy generator 36 generates an authorization policy 24 for the service 12-2 in the form of the authorization policy record 44-2. The authorization policy record 44-2 authorizes requests to the service 12-2 only from the service 12-1, and only to port P1 of the service 12-2. Any requests sent to the service 12-2 from any service 12 other than the service 12-1 will be rejected, and any request sent from the service 12-1 to the service 12-2 to any port other than port P1 will be rejected.

The authorization policy generator 36 analyzes the request records 20 to determine if the service 12-3 is a receiving service for any requests. The authorization policy generator 36 identifies the request records 20-3 and 20-6 as request records 20 in which the service 12-3 is a receiving service. The authorization policy generator 36 accesses the configuration information 38 and determines that there are no particular restrictions identified for the service 12-3. Based on the request records 20-3 and 20-6, the authorization policy generator 36 generates an authorization policy 24 for the service 12-3 in the form of authorization policy records 44-3 and 44-4. The authorization policy record 44-3 authorizes requests to the service 12-3 from the service 12-2, and only to port P1 of the service 12-3. The authorization policy record 44-4 authorizes requests to the service 12-3 from the service 12-4, and only to port P2 of the service 12-3. Any requests sent to the service 12-3 from any service 12 other than the services 12-2 and 12-4 will be rejected. Any request sent from the service 12-2 to the service 12-3 to any port other than port P1 will be rejected, and any request sent from the service 12-4 to the service 12-3 to any port other than port P2 will be rejected.

The authorization policy generator 36 analyzes the request records 20 to determine if the service 12-4 is a receiving service for any requests, and generates an authorization policy 24 for the service 12-4 in the form of an authorization policy record 44-5.

The authorization policy generator 36 analyzes the request records 20 to determine if the service 12-5 is a receiving service for any requests. The authorization policy generator 36 identifies the request record 20-4 as a request record 20 in which the service 12-5 is a receiving service. The authorization policy generator 36 accesses the configuration information 38 and determines that there is a particular restriction identified for the service 12-5. Specifically, the configuration information 38 indicates that only requests to port P2 of the service 12-5 from the service 12-3 are authorized. Based on the configuration information 38, the authorization policy generator 36 generates an authorization policy 24 for the service 12-5 in the form of an authorization policy record 44-6. The authorization policy record 44-6 authorizes requests to the service 12-5 from the service 12-3, but only to port P2 of the service 12-5. Any requests sent to the service 12-5 from any service 12 other than the service 12-3 will be rejected, and any subsequent request sent from the service 12-3 to the service 12-5 to any port other than port P2 will be rejected.

Because the authorization policy generator 36 is a component of the computing device 28, functionality implemented by the authorization policy generator 36 may be attributed to the computing device 28 generally. Moreover, in examples where the authorization policy generator 36 comprises software instructions that program the processor device 30 to carry out functionality discussed herein, functionality implemented by the authorization policy generator 36 may be attributed herein to the processor device 30.

In some examples, in addition to or in lieu of the port number, the authorization management system 22 may use other attributes for authorization. For example, the telemetry system 18 may be capable of capturing additional data relating to requests, such as a particular function of a receiving service 12 that a sending service 12 invokes. The authorization management system 22 may include in the authorization policies 24 a particular function that may be invoked by a sending service 12, such that sending services 12 may only invoke the identified function of the receiving service 12. Attempts to invoke any other function will result in a rejection by the authorization management system 22. As an example, in some implementations, the telemetry system 18 may capture which particular HTTP request method (e.g., function) is invoked by a sending service 12, such as an HTTP GET method, an HTTP PUT method, an HTTP HEAD method, an HTTP POST method, or the like. The authorization management system 22 may include in the authorization policies 24 the particular HTTP request method that may be invoked by a sending service 12, such that sending services 12 may only invoke the identified particular HTTP request method of the receiving service 12.

Figure 2:
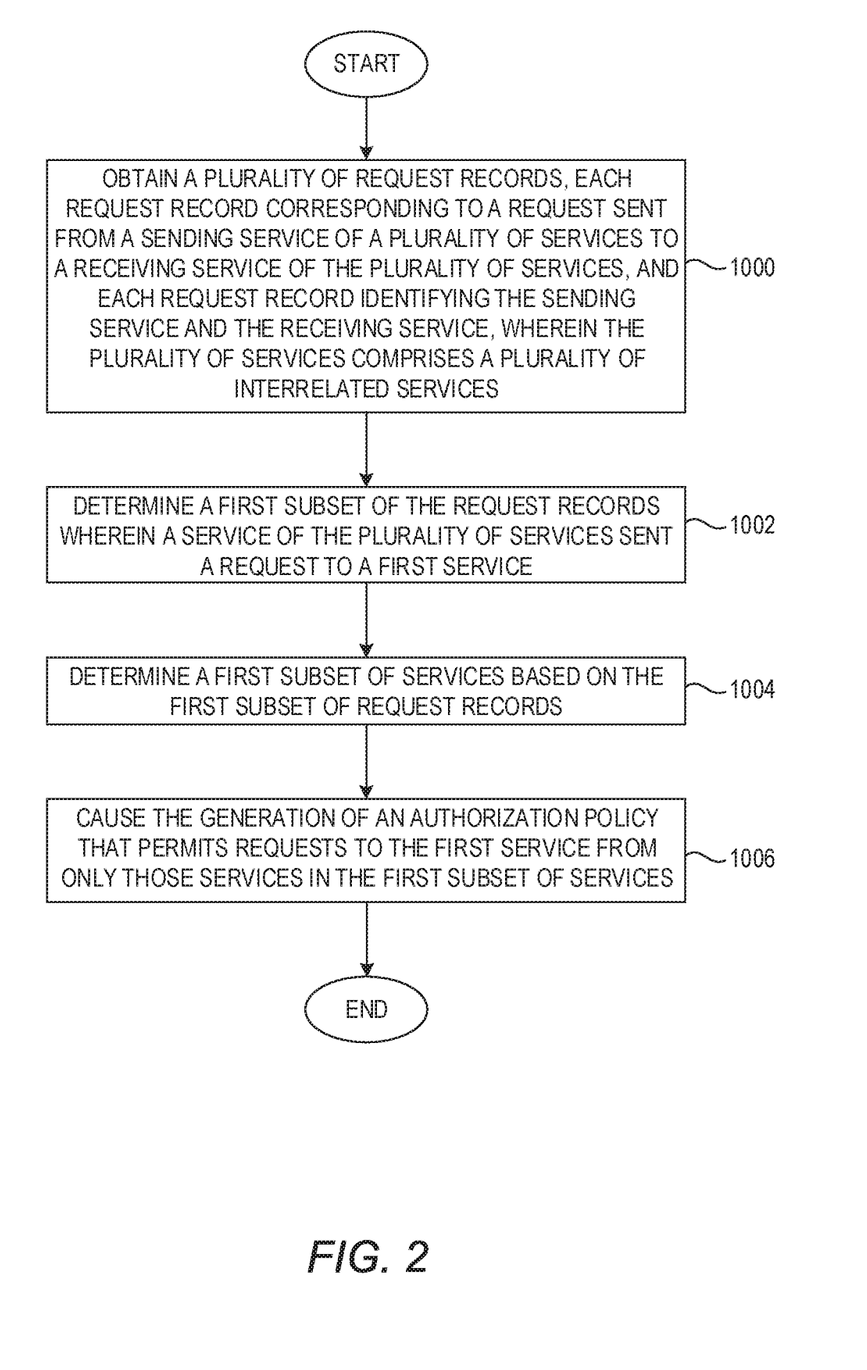
FIG. 2 is a flowchart of a method for automated authorization policy creation for interrelated services according to one example.

FIG. 2 is a flowchart of a method for automated authorization policy creation for interrelated services according to one example. FIG. 2 will be discussed in conjunction with FIG. 1. For purposes of illustration, it will be assumed that the service 12-1 is the sending service 12 and the service 12-2 is the receiving service 12. The computing device 28 obtains the plurality of request records 20. Each request record 20 corresponds to a request sent from a sending service 12 of the plurality of services 12 to a receiving service 12 of the plurality of services 12, and identifies the sending service 12 and the receiving service 12. The plurality of services 12 comprises a plurality of interrelated services 12 (FIG. 2, block 1000). The computing device 28 determines a subset of the request records 20 wherein the service 12-1 sent a request to the service 12-2 (FIG. 2, block 1002). In this example, the subset of request records 20 comprises the request record 20-2. The computing device 28 determines a subset of services 12 based on the subset of request records 20 (FIG. 2, block 1004). In this example, the subset of services 12 is the service 12-1. The computing device 28 causes the generation of an authorization policy 24 that permits requests to the service 12-2 from only the service 12-1 in the subset of services 12 (FIG. 2, block 1006). In this example, the authorization policy 24 is in the form of the authorization policy record 44-2. The term "causes" in this context refers to the computing device 28 directly generating an authorization policy 24, or performing the necessary actions, such as communicating with the authorization management system 22, to cause the authorization management system 22 to generate the authorization policy 24.

It is noted that this process is repeated for all the services 12. Thus, the computing device 28, for each respective service 12, determines a corresponding subset of the request records 20 wherein a service 12 sent a request to the respective service 12. For each respective service 12, the computing device 28 determines a subset of services 12 based on the corresponding subset of the request records 20. The computing device 28 causes, for each respective service 12, the generation of a corresponding authorization policy 24 that permits requests to the respective service 12 from only those services 12 in the corresponding subset of services 12.

Figure 3:
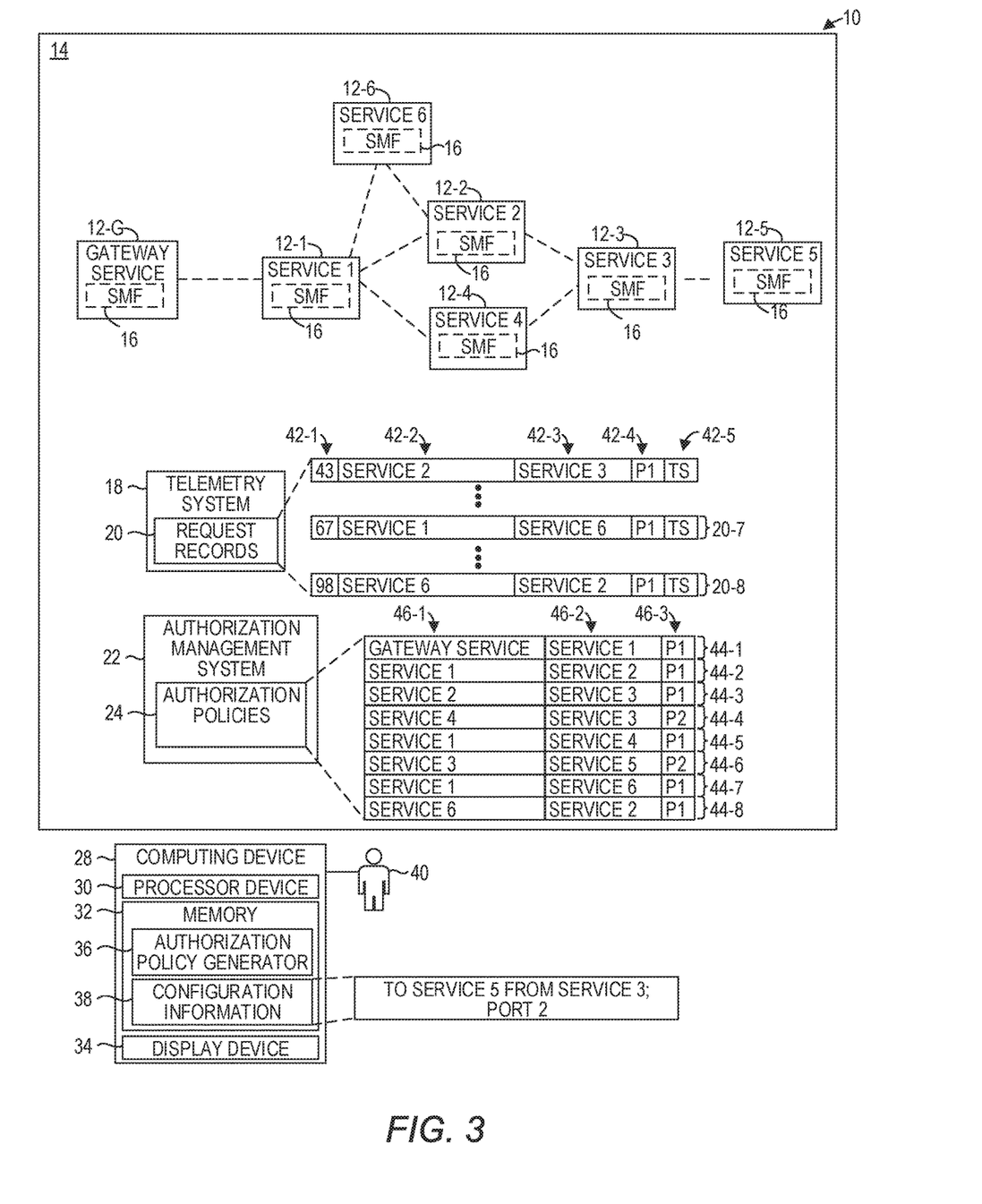
FIG. 3 is a block diagram of the environment illustrated in FIG. 1 after a new service has been added to the interrelated services.

FIG. 3 is a block diagram of the environment 10 after a new service 12-6 has been added to the interrelated services 12. The authorization management system 22 and/or the authorization policy generator 36 may automatically recognize the addition of the new service 12-6, or the operator 40 may interact with the authorization management system 22 and the authorization policy generator 36 to inform the authorization management system 22 and the authorization policy generator 36 that the new service 12-6 has been added to the interrelated services 12. The authorization management system 22 begins a trust stage. The trust stage may be for all the services 12, or only for the new service 12-6. Thus, the authorization management system 22 may still enforce security except for communications with the service 12-6.

Again, the trust stage may have a duration for a period of time such as 1 minute, 5 minutes, 1 hour, 1 day, or the like. A timer may automatically be maintained by the authorization management system 22, the authorization policy generator 36, or may be manually maintained by the operator 40. The services 12 operate during the trust stage and communicate with one another, including the new service 12-6. Each request is recorded by the telemetry system 18 as a request record 20.

After the trust stage ends, such as when the timer has expired, the authorization policy generator 36 accesses the request records 20 that were generated during the trust stage. In this example, during the trust stage, a plurality of request records 20-7-20-N were generated.

The authorization policy generator 36 accesses the request records 20-7-20-N, and determines that a request record 20-8 is the subset of request records 20 wherein the service 12-6 received a request, and that the service 12-1 is the subset of services 12 that sent a request to the service 12-6. The authorization policy generator 36 then generates an authorization policy 24 in the form of an authorization policy record 44-7 that permits requests to the service 12-6 from only the service 12-1.

The authorization policy generator 36 also analyzes the request records 20-7-20-N to determine if any of the existing services 12-1-12-5 received a request from the new service 12-6. The authorization policy generator 36 determines that the service 12-2 received a request from the new service 12-6. The authorization policy generator 36 supplements the authorization policy 24 for the service 12-2 in the form of an authorization policy record 44-8 that permits requests to the service 12-2 from the service 12-6. In some examples, the authorization policy generator 36 may present, on the display device 34, information to the operator 40 identifying the generation of the authorization policy records 44-7 and 44-8.

Figure 4:
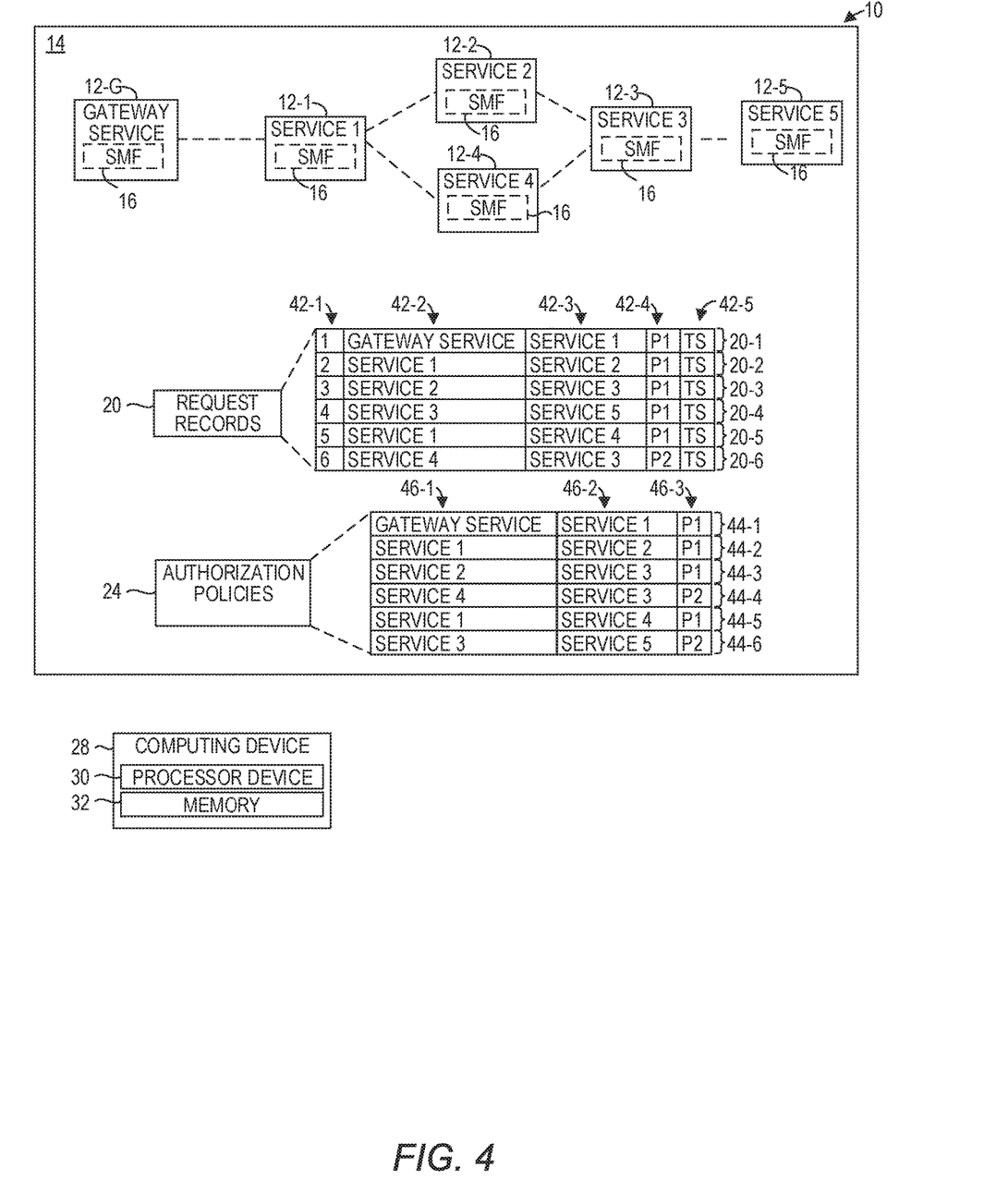
FIG. 4 is a simplified block diagram of the environment illustrated in FIG. 1 according to one example.

FIG. 4 is a simplified block diagram of the environment 10 according to one example. FIG. 4 includes the computing device 28, which in turn includes the memory 32 and the processor device 30 coupled to the memory 32. The processor device 30 is to obtain the plurality of request records 20, each request record 20 corresponding to a request sent from a sending service 12 of the plurality of services 12 to a receiving service 12 of the plurality of services 12. Each request record 20 identifies the sending service 12 and the receiving service 12, and the plurality of services 12 comprises a plurality of interrelated services 12. The processor device 30 is to determine a subset of the request records 20 wherein a service 12 of the plurality of services 12 sent a request to a first service 12. The processor device 30 is to determine a subset of services 12 based on the subset of request records 20. The processor device 30 is to cause the generation of an authorization policy 24 that permits requests to the first service 12 from only those services 12 in the subset of services 12.

Figure 5:
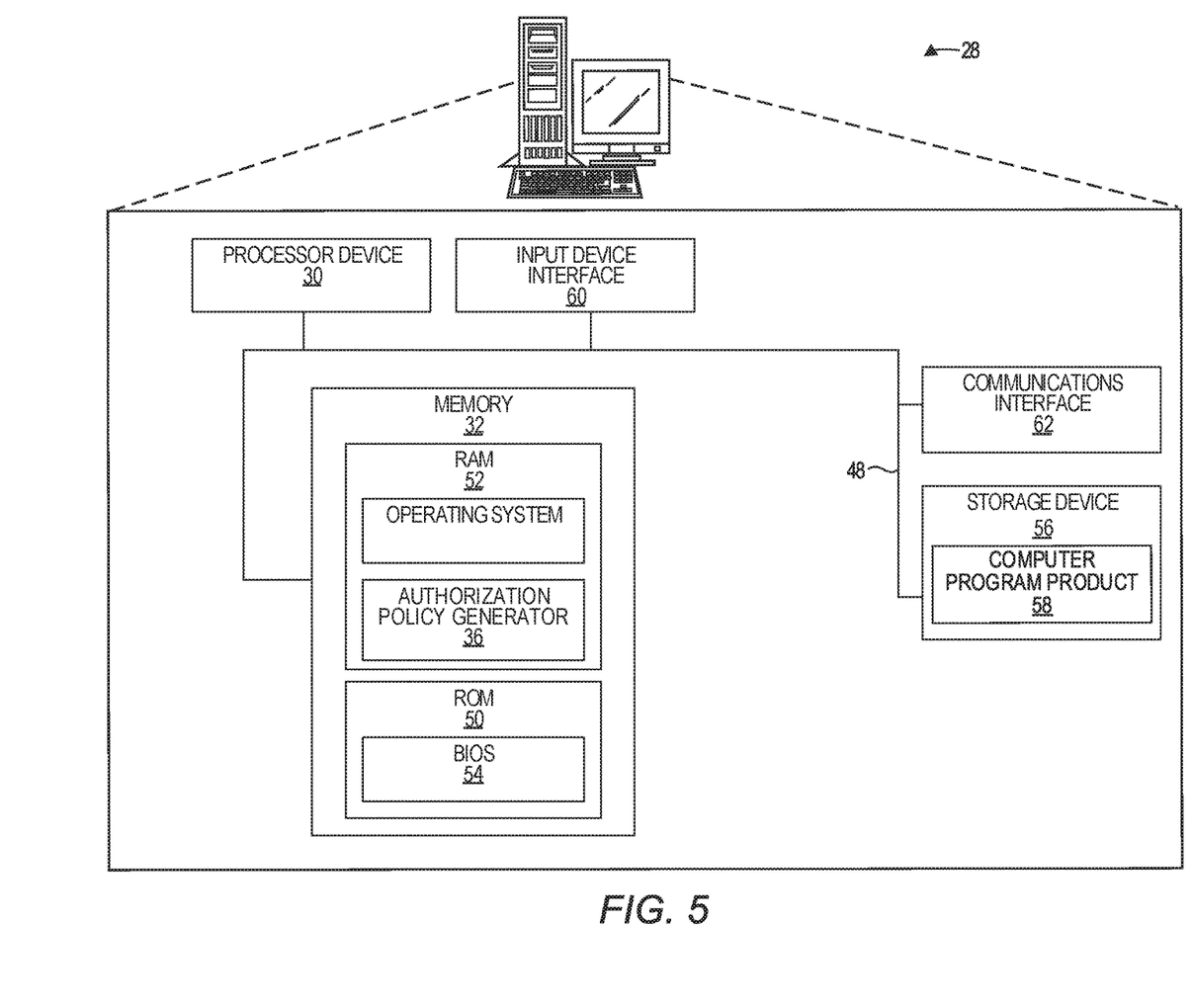
FIG. 5 is a block diagram of a computing device suitable for implementing examples according to one example.

FIG. 5 is a block diagram of the computing device 28 suitable for implementing examples according to one example. The computing device 28 may comprise any computing or electronic device capable of including firmware, hardware, and/or executing software instructions to implement the functionality described herein, such as a computer server, a desktop computing device, a laptop computing device, or the like. The computing device 28 includes the processor device 30, the memory 32, and a system bus 48. The system bus 48 provides an interface for system components including, but not limited to, the memory 32 and the processor device 30. The processor device 30 can be any commercially available or proprietary hardware processor device, such, by way of non-limiting example, an Intel®, AMD®, or IBM® hardware processor device.

The system bus 48 may be any of several types of bus structures that may further interconnect to a memory bus (with or without a memory controller), a peripheral bus, and/or a local bus using any of a variety of commercially available bus architectures. The memory 32 may include non-volatile memory 50 (e.g., read-only memory (ROM), erasable programmable read-only memory (EPROM), electrically erasable programmable read-only memory (EEPROM), etc.), and volatile memory 52 (e.g., random-access memory (RAM)). A basic input/output system (BIOS) 54 may be stored in the non-volatile memory 50 and can include the basic routines that help to transfer information between elements within the computing device 28. The volatile memory 52 may also include a high-speed RAM, such as static RAM, for caching data.

The computing device 28 may further include or be coupled to a non-transitory computer-readable storage medium such as a storage device 56, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 56 and other drives associated with computer-readable media and computer-usable media may provide non-volatile storage of data, data structures, computer-executable instructions, and the like.

A number of modules can be stored in the storage device 56 and in the volatile memory 52, including an operating system and one or more program modules, such as the authorization policy generator 36, which may implement the functionality described herein in whole or in part.

All or a portion of the examples may be implemented as a computer program product 58 stored on a transitory or non-transitory computer-usable or computer-readable storage medium, such as the storage device 56, which includes complex programming instructions, such as complex computer-readable program code, to cause the processor device 30 to carry out the steps described herein. Thus, the computer-readable program code can comprise software instructions for implementing the functionality of the examples described herein when executed on the processor device 30. The processor device 30, in conjunction with the authorization policy generator 36 in the volatile memory 52, may serve as a controller, or control system, for the computing device 28 that is to implement the functionality described herein.

The operator 40 may also be able to enter one or more configuration commands through a keyboard, a pointing device such as a mouse (not illustrated), or a touch-sensitive surface such as a display device. Such input devices may be connected to the processor device 30 through an input device interface 60 that is coupled to the system bus 48 but can be connected by other interfaces such as a parallel port, an Institute of Electrical and Electronic Engineers (IEEE) 1394 serial port, a Universal Serial Bus (USB) port, an IR interface, and the like. The computing device 28 may also include a communications interface 62, such as an Ethernet transceiver, or the like, suitable for communicating with other devices, as appropriate or desired.

Individuals will recognize improvements and modifications to the preferred examples of the disclosure. All such improvements and modifications are considered within the scope of the concepts disclosed herein and the claims that follow.

What is claimed is:

1. A method for automated creation of authorization policy comprising:
    obtaining, by a computing device, a plurality of request records, each request record corresponding to a request sent from a sending service of a plurality of services to a receiving service of the plurality of services, and each request record identifying the sending service and the receiving service, wherein the plurality of services comprises a plurality of interrelated services;
    determining a first subset of the request records from the plurality of request records wherein each request record in the first subset of request records identifies a service of the plurality of services that sent a request to a first service;
    determining a first subset of services from among the plurality of services based on the first subset of request records; and
    causing the generation of an authorization policy that permits requests to the first service from only those services in the first subset of services, wherein the authorization policy comprises one or more authorization policy records, wherein each authorization policy record identifies the first service as a destination service and only permits requests from a service of the first subset of services as a sending service specifically identified in the authorization policy record.

2. The method of claim 1 wherein each request record in the first subset of request records identifies a port number of the first service to which a respective service identified in the request record sent a request, and wherein causing the generation of the authorization policy that permits the requests to the first service from only those services in the first subset of services further comprises causing the generation of the authorization policy that permits the requests to the first service from only those services in the first subset of services that are sent to a same port number of the first service to which each respective service sent a request.

3. The method of claim 1 further comprising:
initiating a timer that expires after a predetermined time period;
determining that the timer has expired; and
wherein the plurality of request records consists of those request records generated during the predetermined time period.

4. The method of claim 1 wherein the plurality of interrelated services comprises a service mesh.

5. The method of claim 1 wherein the plurality of interrelated services comprises a service mesh, wherein each service comprises a corresponding sidecar proxy container, and wherein each service communicates with other services via the corresponding sidecar proxy container.

6. The method of claim 1 further comprising:
determining, by an authorization management system, that a second service has sent a request to the first service;
accessing, by the authorization management system, the authorization policy; and
based on the authorization policy, rejecting the request from the second service to the first service.

7. The method of claim 1 further comprising:
in response to a new service being added to the plurality of interrelated services, initiating a timer that expires after a predetermined time period;
determining that the timer has expired;
accessing a set of request records generated during the predetermined time period;
determining a second subset of request records of the set of request records wherein a service of the plurality of services sent requests to the new service;
determining a second subset of services based on the second subset of request records; and
causing the generation of an authorization policy that permits requests to the new service from only those services in the second subset of services.

8. The method of claim 1 wherein determining the first subset of request records wherein the service of the plurality of services sent the request to the first service further comprises:
for each respective service of several services of the plurality of interrelated services, determining a corresponding subset of the request records wherein a service sent a request to the respective service;
for each respective service of the several services of the plurality of interrelated services, determining a corresponding subset of services based on the corresponding subset of the request records; and
wherein causing the generation of the authorization policy that permits requests to the first service from only those services in the first subset of services further comprises:
causing, for each respective service of the several services, the generation of a corresponding authorization policy that permits requests to the respective service from only those services in the corresponding subset of services.

9. The method of claim 1 further comprising:
accessing configuration information associated with the first service;
determining that the configuration information identifies a particular restriction associated with the first service; and
wherein causing the generation of the authorization policy that permits requests to the first service from only those services in the first subset of services further comprises causing the generation of an authorization policy that permits requests to the first service from only those services in the first subset of services and that satisfy the particular restriction.

10. The method of claim 9 wherein the first service comprises a plurality of functions that are configured to be invoked by a service, and wherein the particular restriction identifies a particular function of the plurality of functions, and wherein causing the generation of the authorization policy that permits the requests to the first service from only those services in the first subset of services and that satisfy the particular restriction comprises causing the generation of the authorization policy that permits the requests to the first service from only those services in the first subset of services and that only invoke the particular function.

11. A computing device for automated creation of authorization policy, comprising:
a memory; and
a processor device coupled to the memory to:
obtain a plurality of request records, each request record corresponding to a request sent from a sending service of a plurality of services to a receiving service of the plurality of services, and each request record identifying the sending service and the receiving service, wherein the plurality of services comprises a plurality of interrelated services;
determine a first subset of the request records from the plurality of request records wherein each request record in the first subset of request records identifies a service of the plurality of services that sent a request to a first service;
determine a first subset of services from among the plurality of services based on the first subset of request records; and cause the generation of an authorization policy that permits requests to the first service from only those services in the first subset of services, wherein the authorization policy comprises one or more authorization policy records, wherein each authorization policy record identifies the first service as a destination service and only permits requests from a service of the first subset of services as a sending service specifically identified in the authorization policy record.

12. The computing device of claim 11 wherein each request record in the first subset of request records identifies a port number of the first service to which a respective service identified in the request record sent a request, and wherein to cause the generation of the authorization policy that permits the requests to the first service from only those services in the first subset of services, the processor device is further to cause the generation of the authorization policy that permits the requests to the first service from only those services in the first subset of services that are sent to a same port number of the first service to which each respective service sent a request.

13. The computing device of claim 11 wherein the plurality of request records consists of those request records generated during a predetermined time period.

14. The computing device of claim 11 wherein the processor device is further to:

in response to a new service being added to the plurality of interrelated services, initiate a timer that expires after a predetermined time period;

determine that the timer has expired;

access a set of request records generated during the predetermined time period;

determine a second subset of request records of the set of request records wherein a service of the plurality of services sent requests to the new service;

determine a second subset of services based on the second subset of request records; and cause the generation of an authorization policy that permits requests to the new service from only those services in the second subset of services.

15. The computing device of claim 11 wherein, to determine the first subset of request records wherein the service of the plurality of services sent the request to the first service, the processor device is further to:

for each respective service of several services of the plurality of interrelated services, determine a corresponding subset of the request records wherein a service sent a request to the respective service;

for each respective service of the several services of the plurality of interrelated services, determine a corresponding subset of services based on the corresponding subset of the request records; and wherein, to cause the generation of the authorization policy that permits requests to the first service from only those services in the first subset of services, the processor device is further to:

cause, for each respective service of the several services, the generation of a corresponding authorization policy that permits requests to the respective service from only those services in the corresponding subset of services.

16. A non-transitory computer-readable storage medium that includes executable instructions for automated creation of authorization policy to cause a processor device to:

obtain a plurality of request records, each request record corresponding to a request sent from a sending service of a plurality of services to a receiving service of the plurality of services, and each request record identifying the sending service and the receiving service, wherein the plurality of services comprises a plurality of interrelated services;

determine a first subset of the request records from the plurality of request records wherein each request record in the first subset of request records identifies a service of the plurality of services that sent a request to a first service;

determine a first subset of services from among the plurality of services based on the first subset of request records; and cause the generation of an authorization policy that permits requests to the first service from only those services in the first subset of services, wherein the authorization policy comprises one or more authorization policy records, wherein each authorization policy record identifies the first service as a destination service and only permits requests from a service of the first subset of services as a sending service specifically identified in the authorization policy record.

17. The non-transitory computer-readable storage medium of claim 16 wherein each request record in the first subset of request records identifies a port number of the first service to which a respective service identified in the request record sent a request, and wherein to cause the generation of the authorization policy that permits the requests to the first service from only those services in the first subset of services, the instructions are further to cause the processor device to cause the generation of the authorization policy that permits the requests to the first service from only those services in the first subset of services that are sent to a same port number of the first service to which each respective service sent a request.

18. The non-transitory computer-readable storage medium of claim 16 wherein the plurality of request records consists of those request records generated during a predetermined time period.

19. The non-transitory computer-readable storage medium of claim 16 wherein the instructions are further to cause the processor device to:

in response to a new service being added to the plurality of interrelated services, initiate a timer that expires after a predetermined time period;

determine that the timer has expired;

access a set of request records generated during the predetermined time period;

determine a second subset of request records of the set of request records wherein a service of the plurality of services sent requests to the new service;

determine a second subset of services based on the second subset of request records; and cause the generation of an authorization policy that permits requests to the new service from only those services in the second subset of services.

20. The non-transitory computer-readable storage medium of claim 16 wherein, to determine the first subset of request records wherein the service of the plurality of services sent the request to the first service, the instructions are further to cause the processor device to:

for each respective service of several services of the plurality of interrelated services, determine a corresponding subset of the request records wherein a service sent a request to the respective service;

for each respective service of the several services of the plurality of interrelated services, determine a corresponding subset of services based on the corresponding subset of the request records; and wherein, to cause the generation of the authorization policy that permits requests to the first service from only those services in the first subset of services, the instructions are further to cause the processor device to:

cause, for each respective service of the several services, the generation of a corresponding authorization policy that permits requests to the respective service from only those services in the corresponding subset of services.

\* \* \* \* \*